United States Patent
Tuson

[15] 3,635,301
[45] Jan. 18, 1972

[54] ELECTRICALLY POWERED VEHICLES

[72] Inventor: Ian V. Tuson, Bognor Regis, England

[73] Assignee: Harlequin Manufacturing Limited, Christchurch, Hampshire, England

[22] Filed: Oct. 20, 1969

[21] Appl. No.: 867,644

[30] Foreign Application Priority Data

Feb. 19, 1969 Great Britain..................... 9022/69

[52] U.S. Cl. ........................180/19 H, 180/25 A, 180/27, 180/65, 280/DIG. 5, 280/36 R
[51] Int. Cl. ................B62d 61/00, B62d 1/00, B62d 51/00
[58] Field of Search ..........................280/DIG. 1–5, 34 B, 280/36 R; 180/27, 19 H, 19 S, 19, 16, 26, 21, 25, 65

[56] References Cited

UNITED STATES PATENTS

| 2,706,008 | 4/1955 | Voigt | 280/DIG. 5 |
|---|---|---|---|
| 2,792,718 | 5/1957 | Ellison | 180/19 H X |
| 2,918,134 | 12/1959 | Jensen | 180/27 |
| 2,973,048 | 2/1961 | Jensen | 180/27 |
| 3,190,676 | 6/1965 | Junge | 180/27 X |
| 3,249,171 | 5/1966 | Kinghorn | 180/27 |
| 3,254,734 | 6/1966 | Behrmann | 280/36 X |
| 3,388,759 | 6/1968 | Plamper et al. | 180/19 |

*Primary Examiner*—Benjamin Hersh
*Assistant Examiner*—John P. Silverstrim
*Attorney*—Holcombe, Wetherill & Brisebois

[57] ABSTRACT

The invention relates to a three-wheeled electric golf trolley, two rear wheels of which are driven via separate free wheel mechanisms by a battery-powered electric motor. The single front wheel is steerable by a handle intended to be grasped by a pedestrian, the inclination of the handle being adjustable, and being employed to control the operation of the motor.

4 Claims, 4 Drawing Figures

ELECTRICALLY POWERED VEHICLES

The present invention relates to vehicles powered by electric motors, and more particularly to an electric trolley, such as a golf trolley, provided with an electric drive motor powered by a source of electrical energy, such as a battery, accumulator or the like, carried by the trolley.

According to the present invention, there is provided an electric trolley provided with an electric drive motor powered by a source of electrical energy carried by the trolley, first and second road wheels drivingly connected to the motor via first and second free wheel mechanisms, a third road wheel arranged for angular displacement to steer the trolley, and means, operable by a pedestrian, adapted both to steer the first wheel and to control the operation of the motor.

In order that the invention may be more readily understood, reference will now be made to the accompanying drawings, FIGS. 1 and 2 are, respectively, side and plan views of a golf trolley according to one embodiment of the invention;

Figure 1:
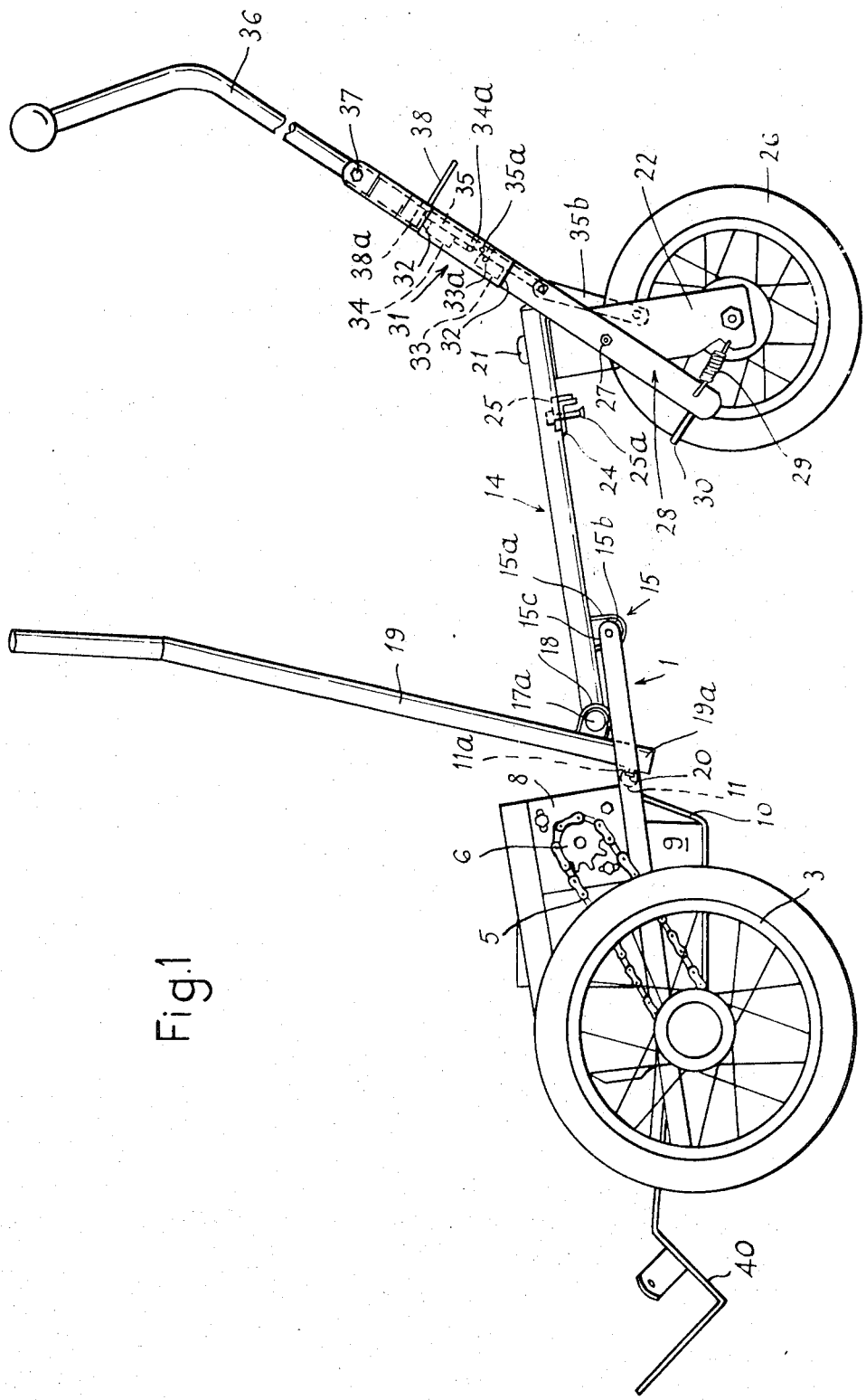
Figure 2:
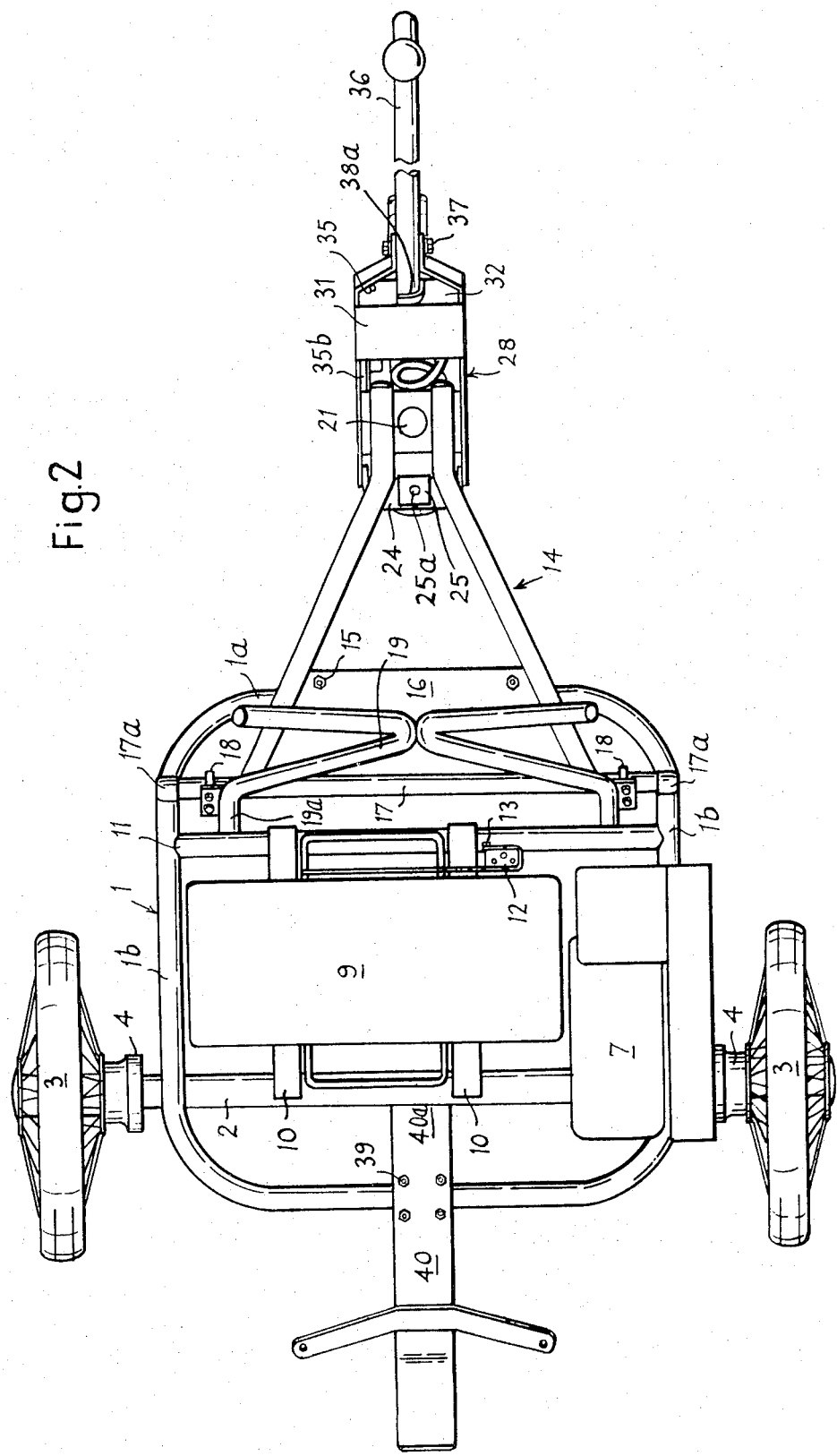
Figure 3:
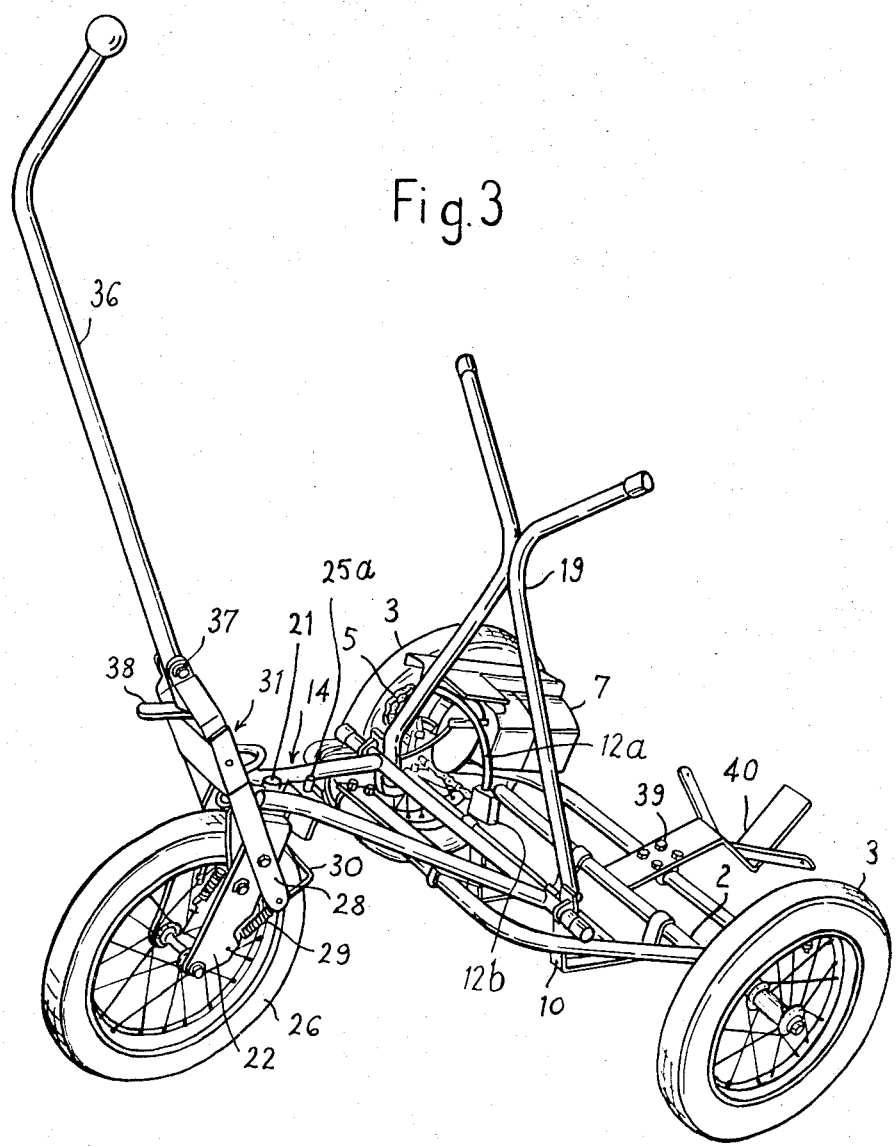
FIG. 3 is a perspective view of a modified version of the trolley.

Referring to FIGS. 1 to 3, the golf trolley comprises a main frame 1. An axle (not shown) is journaled in a crossmember 2 secured to the main frame 1, and a pair of rear wheels 3 are rotatably mounted on opposite ends of this axle. Each wheel 3 is provided with a free wheel mechanism 4 which drivingly connects the axle to both wheels when the axle is rotated in a clockwise direction in FIG. 1. The axle is driven by a chain sprocket (not shown) rigid with the axle, and connected via a chain 5 to the output drive sprocket 6 of a reduction gear driven by a low voltage, for example, 12 volt, direct current electric motor 7. The motor is mounted on a slotted plate 8 to permit adjustment of the tension in the chain 5.

With reference to FIGS. 1 and 2, the motor 7 is powered by a battery or accumulator 9 removably mounted in a battery carrier comprising stirrups 10 extending between the crossmembers 2 and 11 of the main frame 1. The battery is connected by a wiring harness (not shown) incorporated in the carrier to a plug or socket 12 clamped to the carrier by a pinch bolt 13. The trolley illustrated in FIG. 3 differs from that of FIGS. 1 and 2 only insofar as the plug or socket 12 is omitted, the motor 7 being connected by a harness 12a to a plug or socket 12b intended to be connected directly to an equivalent socket or plug forming part of or associated with the battery (not shown in FIG. 3).

A triangulated subframe 14 is hingedly mounted on the front crossmember 1a of the main frame 1 by means of friction bearings 15 clamped around the member 1a and carried by a transverse plate 16 secured to the subframe 14. The base of this subframe 14 comprises a transverse member 17, opposite ends 17a of which extend across the longitudinal members 1b of the main frame 1, and abut the latter to prevent the subframe 14 from being hinged in an anticlockwise direction about its bearings 15 beyond its position shown in FIG. 1.

Journaled on the transverse base member 17, by means of friction bearings 18, is a tubular generally X-shaped golf bag front rest 19 which is prevented from rotating from its position shown in FIG. 1, about the member 17 in a clockwise direction, by engagement of the lower ends 19a thereof with the main frame crossmember 11. One or both of the lower ends 19a of the front rest 19 may be provided with a pin 20 (FIG. 1) detachably engageable in an aperture 11a in the crossmember 11. When the pin and aperture are so engaged, the subframe 14 is positively prevented from hinging from its FIG. 1 position in a clockwise direction about its bearings 15.

Carried by the forward end or apex of the subframe 14 is a bearing 21 by means of which a pair of front forks 22 are connected to the subframe so as to be rotatable relative thereto about an axis disposed generally normally to the plane of the subframe. An inverted L-shaped bracket 24 is secured to the subframe adjacent the bearing 21, on which rests a manually vertically movable inverted L-shaped stop 25 attached to a pin 25a passing through an aperture in the bracket 24. The stop 25 is engaged by the forks 22 when turned, to limit the degree of turning movement of the forks during use. However, by lifting the stop 25, the forks may be turned beyond their limit positions without engaging the stop, to a position in which the forks are at right angles to their position shown in the drawings, whereafter they may be locked in this displaced position by releasing the stop 25, allowing it to drop back to its position shown in which it is again engageable with the forks.

A front wheel 26 is rotatably mounted in the front forks 22, and pivoted at 27 to the forks 22 are the two limbs of a forked control lever 28. This lever is normally biassed by a coil spring 29 in an anticlockwise direction about its pivots 27 to the position shown in FIG. 1, in which a rigid hoop 30 interconnecting the lower free ends of the limbs of the control lever 28 engages the tire of the front wheel 26 to act as a brake thereon. A compartment 31 is provided between the sides of the upper end of the lever 28, defined by the sides of the lever, transverse end walls 32, a base and a detachable lid (not shown). A pair of microswitches 33, 34 are mounted in the compartment 31, connected via a wiring harness passing through the subframe and main frame to the motor 7 and a plug (not shown) cooperable with the battery socket 12. One of these microswitches 33 constitutes an "on"/"off" control for the motor and is actuated by an arm indicated diagrammatically at 33a. The other microswitch 34 is a change over switch, and is connected into the energizing circuit of the motor in series with the "on"/"off" microswitch 33, to two different voltage tappings of the battery 9. This microswitch 34 constitutes a speed control when the motor is energized, and is actuated by an arm indicated diagrammatically at 34a. These arms 33a, 34a are actuated by a pin 35a carried by a push rod 35 slidably mounted in the end walls 32 of the compartment. The push rod is, in turn, actuated by link 35b which, at its upper end, is hingedly connected to the lower end of the pushrod 35, and, at its lower end is pivotally connected to one of the front forks 22.

An arm or handle 36 is hingedly connected by a friction bearing 37 to the upper end of the control lever 28, and the lower end of this handle is cooperable with the U-shaped camming surfaces 38a of a manually operated locking lever 38, pivotally mounted on the upper end wall 32. This lever 38 may be so designed that movement of the handle 36 about its bearing 37 in a clockwise direction into the position shown in FIG. 1 rocks the lever to an overcenter position in which its camming surfaces 38a lock the handle against movement about its bearing 37 in either direction until the lever 38 is manually released.

Hingedly connected to the rear crossmember 1b by friction bearings 39 is a rear rest 40 for supporting the bottom of a golf bag. This rest 40 is prevented from rotating beyond its FIG. 1 position, in an anticlockwise direction, by engagement of the inner end 40a of the rest beneath the main frame crossmember 2.

The trolley may be manufactured, in the main, from mild steel sheet and rectangular and square tubing. The wheels may be spoked and provided with "holomatic" tires.

Some or all of the friction bearings 15, 18 and 39 may each advantageously comprise a metal U-bolt threaded at each end to receive a nut, and containing a two-part split bush formed of a resilient synthetic plastics material such as nylon. The bush comprises a semicircular ring portion having a grooved outer periphery receiving and locating the curved base part of the U-bolt and a portion having a semicircular opening therein, grooved sidewalls to receive and locate opposite side limbs of the U-bolt, and a flat base extending between the opposite side limbs which engages the surface of the trolley to which the U-bolt is bolted. The semicircular openings in the two-bush portions cooperate to define a cylindrical bearing surface. For example, as shown in FIG. 1 with reference to the bearing 15, this bearing comprises a U-bolt 15a, and a two-part split bush composed of a semicircular ring portion 15b and a portion 15c.

By tightening or loosening the U-bolt the compression on the bush will be varied and the frictional grip of the bush on the member, e.g., crossmember, located therein will likewise be adjusted. This particular bearing arrangement, is silent in operation, requires no lubrication, and may be easily adjusted to give the required frictional resistance.

In the trolley illustrated in FIGS. 1 to 3, the free wheel mechanisms 4 are combined with the hubs of the rear wheels 3. These mechanisms may alternatively be combined with the chain drive arrangement connecting the motor to the rear axle. Such a modified drive arrangement is shown in FIG. 4.

Figure 4:
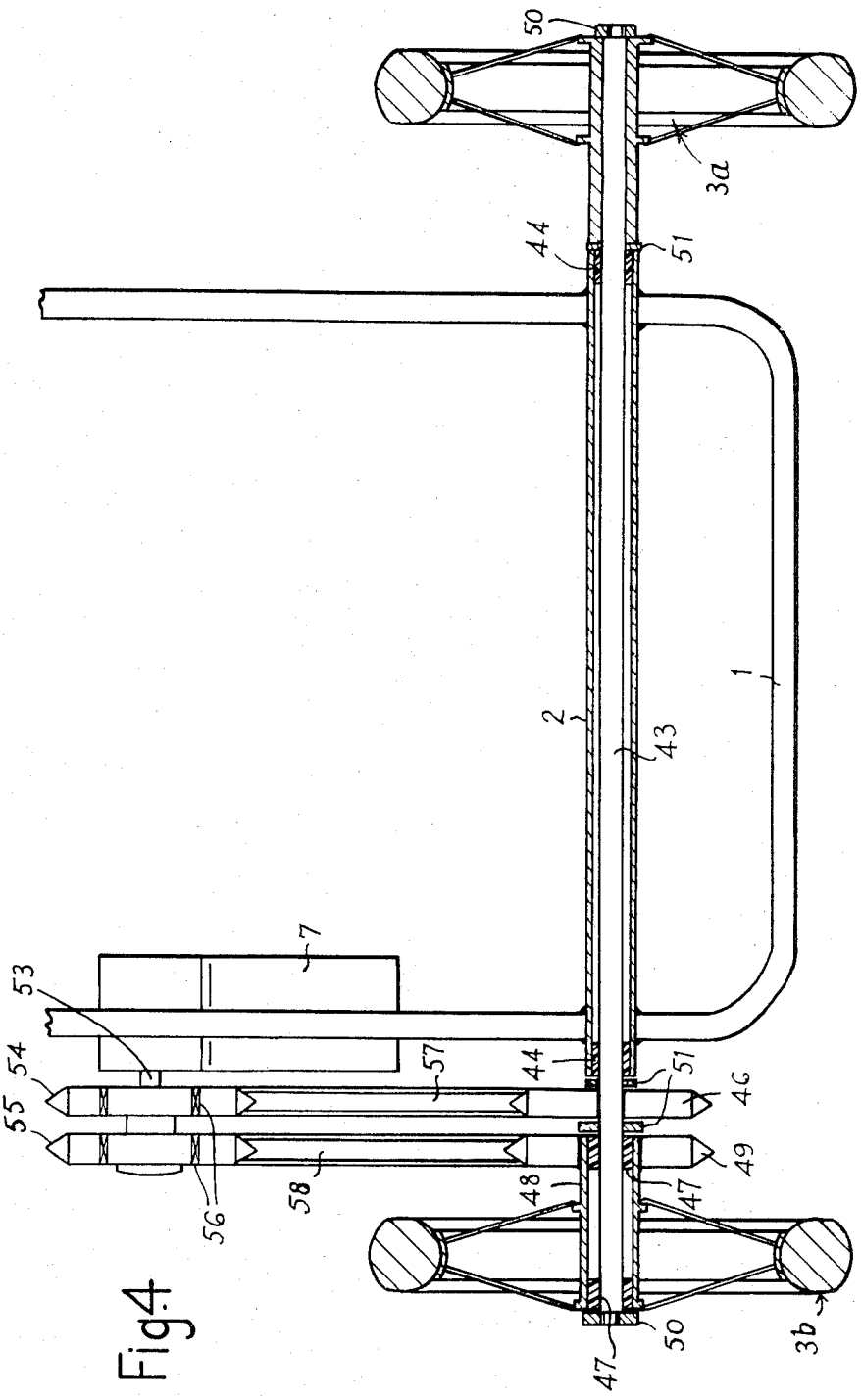
FIG. 4 is a sectional plan view of the rear part of a trolley incorporating a modified drive arrangement for the rear wheels.

Referring to FIG. 4, a rear axle 43 is rotatably mounted in bearings 44 carried by the tubular crossmember 2. One rear wheel 3a is secured to one end of the axle 43 so as to rotate therewith, and adjacent but spaced from the opposite end thereof is nonrotatably secured a first fixed sprocket 46. Freely rotatably mounted on the latter end of the axle 43, by bearings 47, is a sleeve 48 to which is nonrotatably secured a second-fixed sprocket 49, and the other rear wheel 3b is secured to the sleeve 48 so as to rotate therewith. The latter wheel 3b and sleeve 48, as well as the rear wheel 3a, being retained attached to the axle 43, by nuts 50, one or both of which may be adjustable to take up any unwanted sideplay between the wheel 3a, sprocket 46, and axle casing or tubular crossmember 2, and between the sleeve 48 and sprocket 46, via thrust washers 51.

The bearings 44 and 47 may comprise sleeves, for example, nylon or polytetrafluoroethylene sleeves pressed into opposite ends of the crossmember 2 and sleeve 48 respectively. The thrust washers 51 may be formed from the same material.

The output shaft 53 of the reduction unit of the motor 7 carries a pair of sprockets 54 and 55, each incorporating a free wheel mechanism illustrated diagrammatically at 56, so arranged that rotation of the output shaft 53 in one direction, namely clockwise when viewed from the left-hand side of the drawing, drives these sprockets. The sprockets 54 and 55, which may be free wheel sprockets of the type incorporated in bicycles or the like, are connected by chains 57 and 58 to the fixed sprockets 46 and 49 respectively.

It will be apparent that when the motor 7 is energized, the shaft 53 rotates in a clockwise direction, rotating both sprockets 54 and 55 via their free wheel mechanisms. The sprocket 54, via the chain 57, fixed sprocket 46 and axle 43, rotates the rear wheel 3a, while the sprocket 55, via the chain 58, fixed sprocket 49 and sleeve 48, rotates the other rear wheel 3b in the same direction and at the same speed.

In use of the trolley shown in FIGS. 1 to 3, or modified in accordance with FIG. 4, a golf bag is rested in the front and rear rests 19 and 40 respectively, and is secured thereto, for example by straps passing over the bag.

In the position of the control lever 28 and handle 36 shown in FIG. 1, the motor is deenergized, and the hoop 30 is resiliently pressed against the front tire to act as a brake.

To operate the trolley, the handle 36 is grasped by the pedestrian golfer or caddy, and is pulled forward (to the right in FIG. 1). This action swings the lever 28 and handle 36 in a clockwise direction about the lever pivots 27 releasing the brake by moving the hoop 30 away from the front tire. Simultaneously, the pushrod 35 is displaced upwardly by the link 35b, actuating the "on"/"off" microswitch 33 and connecting the motor to the lower voltage tapping of the battery via the microswitch 34. The motor 7 is thus energized to drive both rear wheels, at a reduced speed, via their free wheel mechanisms, so that the trolley will "follow" the operator. If it is desired to increase the speed of the trolley, the handle 36 is pulled further forwards, turning it further clockwise about the pivots 27 and actuating the speed control microswitch 34 to connect the motor to the higher voltage tapping of the battery, thereby increasing the speed of the motor.

The trolley is steered simply by moving the handle 36 laterally, and when the handle is released, the spring 29 returns the handle automatically to its most upright position, deenergizing the motor and reapplying the brake.

Due to the fact that the drive motor 7 drives both rear wheels, adhesion in adverse weather conditions is increased. Furthermore, since each rear wheel is coupled to the drive motor via a separate free wheel mechanism, the trolley may, if desired, or if the motor develops a fault or the battery runs down, be pulled along manually without turning the motor drive shaft. Moreover, when the trolley is travelling along a curved path, the inside rear wheel will be driven while the outside rear wheel will be able to free wheel, thus avoiding skidding of one or both rear wheels which could damage the golf course.

The configuration of the trolley is such that its chassis will support a golf bag with the center of gravity of the golf bag disposed within the wheel base of the trolley so as to stabilize the trolley.

Due to the particular arrangement of the hinge connections between the various components, the weight of the golf bag will tend to assist in retaining these components in their correct unfolded positions. However, any tendency for the subframe 14 to "jackknife" under the main frame 1, for example, if the front wheel should strike an obstruction, will be obviated by the engagement of the headed pin 20 of the front rest 19 in the aperture 11a in the front crossmember 11.

When not in use, the trolley may be folded up to reduce its overall size, to facilitate storage or transport. This is achieved by removing the golf bag and battery, lifting the stop 25, turning the forks 22 to place the wheel at right angles to the rear wheels, and releasing the stop to lock the front wheel in this position. The locking lever 38 is actuated to release the handle 36, and the latter is folded back about its bearing 37 in an anticlockwise direction as viewed in FIG. 1 until it is disposed adjacent the rear of the front wheel. The front rest 19 is then urged anticlockwise about its bearings 18 to disengage its headed-pin 20 from the aperture 11a, enabling the subframe, together with the handle, forks and wheel, to be folded under and against the main frame 1, by rotating the subframe clockwise around its bearings 15. The rear rest 40 is swung clockwise about its bearings 39 until it lies against the top of the main frame 1, and the front rest 19 is swung anticlockwise about its bearings 18 until it also lies against the top of the main frame, alongside the motor 7.

The frictional resistance in the various bearings is sufficient to prevent the trolley inadvertently unfolding, as well as to prevent rattling, or relative movement between the components when unfolded.

It will be understood that various modifications may be made without departing from the scope of the present invention. For example, the invention is not restricted to golf trolleys, but may be applied to trolleys or vehicles for other uses such as supermarket loading, hospital use (transporting gas cylinders, etc.), or transporting outboard motors at marinas, in which event, suitable platforms, supports or the like would replace, or be interchangeable with, the golf bag rests. The trolley may have a rigid or nonfoldable frame instead of being foldable.

A differential may replace the two free wheel mechanisms, through which drive is transmitted to the rear wheels.

Although spoked wheels have been illustrated, these may be replaced by solid wheels, formed, for example, by diecasting, provided with wide profile pneumatic or solid tires.

The friction bearing specifically described, which comprises a U-bolt and associated split bush, is not restricted in use to trolleys, but has a far wider range of applications.

Although a two-speed motor control has been described by means of which the motor speed may be varied in two steps or stages, it will be appreciated that more than two stepwise speed changes may be employed by tapping off more than two different voltages from the battery. Alternatively, a graduated speed control may be achieved by incorporating in the motor circuit, a variable resistor controlled by the inclination of the handle. Instead of employing a variable resistor, which possesses the disadvantage that it consumes power from the supply, the motor speed may be varied continuously or in steps by electronic means, for example by a circuit incorporating a silicon-controlled rectifier such as a "Thyristor" as the motor speed control element.

The motor could also include a reversing mechanism or switch, operable, for example, by pressing the handle towards a more upright position. In this latter event, the free wheel mechanism or mechanisms would be omitted or modified.

In the drive arrangement of FIG. 4, the fixed sprockets 46 and 49 may be interchanged with the free wheel sprockets 54 and 55, i.e., the free wheel sprockets 54 and 55 may be mounted on the axle 43 and sleeve 48 whereas the fixed sprockets 46 and 49 may be mounted on the output drive shaft 53.

The trolley may be modified to accommodate two golf bags located side-by-side, instead of a single bag. In this event, the upwardly opening or bag supporting portions of the front and rear rests 19, 40, may be extended transversely, and means may be provided centrally of one or both rests to locate the bags transversely, and maintain their separation.

The drive arrangement connecting the motor to the rear wheels may include a friction clutch or other form of torque limiting mechanism to minimize the risk of damage to the components of the drive arrangement should the arrangement be subjected to excessive loads or torques, for example, if excessive drag is applied to the sprockets or upon acceleration or deceleration of the motor at more than a predetermined rate. The mechanism, which may be adjustable and automatic in operation, and may be carried by the output shaft of the reduction gear unit, may take the form described and illustrated in copending British Pat. application No. 45,211/69.

I claim:
1. An electric golf trolley including a chassis, an electric drive motor powered by a source of electrical energy carried by the chassis, first and second road wheels rotatably attached to the chassis, a drive arrangement connecting the motor to the first and second road wheels, said drive arrangement including first and second free wheel mechanisms, the motor being connected to the first road wheel via the first free wheel mechanism, and to the second road wheel via the second free wheel mechanism a third road wheel comprising the front wheel of the trolley rotatably attached to the chassis and arranged for angular displacement relative thereto about a generally vertical axis to steer the trolley, and control means comprises a handle, intended to be grasped by a pedestrian, mounted for displacement about said generally vertical axis to steer the front wheel, and also mounted for inclination about a generally horizontal axis, the trolley including a motor control unit connected to the handle and adapted to control the operation of the motor in dependence upon the inclination of the handle, the handle being normally spring-biassed towards the first position in which the motor is deenergized by the control unit, the control unit being actuated by the handle to energize the motor upon inclination of the handle from said first position in a direction downwardly and forwardly of the trolley, the chassis of the trolley including a main frame which comprises a generally flat rectangular framework including front and rear crossmembers interconnected by side members, and a tubular intermediate crossmember within which is journaled a rotatable axle carrying the rear wheels, the chassis further including a subframe which comprises a generally flat triangular framework including side members and a base crossmember, the subframe being journaled, intermediate its base crossmember and its apex, to the front crossmember, and carrying, adjacent the apex thereof, a front wheel carrier, journaled about a generally vertical axis, to which the front wheel is rotatable connected, at least one golf bag support being carried by the chassis, the subframe and said at least one golf bag support being hingedly connected to the main frame for movement between unfolded, operative positions in which said subframe and support are extended with respect to the main frame, and folded, inoperative positions in which they are retracted with respect to the main frame to reduce the overall dimensions of the trolley.

2. A trolley as claimed in claim 1, wherein a first golf bag support is journaled to the base crossmember of the subframe and a second golf bag support is journaled to the rear crossmember, the base crossmember and the supports being provided with extensions arranged to abut the main frame in the unfolded, operative positions of the subframe and said supports, and, latch means being provided which, in said operative positions, cause said first support to cooperate with the main frame to positively retain the subframe in said position, wherein the hinge connections between at least some of the components comprising the main frame, subframe and supports are so arranged that said components, when the trolley is loaded, are urged into their operative positions.

3. A trolley as claimed in claim 2, wherein at least some of the hinge connections comprise friction bearings, each including an axially split bush formed of resilient synthetic plastics material, rotatable relative to one component and secured to another component by a clamping member which is adjustable to compress the split bush to vary its resistance to rotation relative to said one component.

4. A trolley as claimed in claim 1, wherein the handle is journaled to the wheel carrier for inclination about said generally horizontal axis, and the control unit is carried by the handle, the control unit including a first switch operable to energize and deenergize the motor, and a second switch operable to connect the motor, when energized by said first switch, to selected voltage tappings of the source, the switches being actuated by a reciprocable pushrod slidably mounted in the control unit and connected to the wheel carrier by a pivoted link.

* * * * *